United States Patent
Abel et al.

(10) Patent No.: US 12,132,699 B2
(45) Date of Patent: Oct. 29, 2024

(54) IN-LINE TRANSMISSION CONTROL PROTOCOL PROCESSING ENGINE USING A SYSTOLIC ARRAY

(71) Applicant: Securion Systems, Inc., Centerville, UT (US)

(72) Inventors: Timothy Paul Abel, Fruit Heights, UT (US); Jacob Frogget, Centerville, UT (US); Derek Owens, Centerville, UT (US); Jordan Anderson, Centerville, UT (US)

(73) Assignee: Securion Systems, Inc., Centerville, UT (US)

( * ) Notice: Subject to any disclaimer, the term of this patent is extended or adjusted under 35 U.S.C. 154(b) by 110 days.

(21) Appl. No.: 16/518,082

(22) Filed: Jul. 22, 2019

(65) Prior Publication Data

US 2020/0177540 A1 Jun. 4, 2020

Related U.S. Application Data

(60) Provisional application No. 62/703,743, filed on Jul. 26, 2018.

(51) Int. Cl.
*H04L 61/103* (2022.01)
*G06F 30/34* (2020.01)
(Continued)

(52) U.S. Cl.
CPC ............ *H04L 61/103* (2013.01); *G06F 30/34* (2020.01); *H04L 12/4641* (2013.01); *H04L 45/74* (2013.01); *H04L 63/0485* (2013.01); *H04L 69/163* (2013.01); *H04L 69/22* (2013.01); *H04L 2101/622* (2022.05)

(58) Field of Classification Search
CPC ... H04L 29/06; H04L 63/0428; H04L 63/061; H04L 61/103; H04L 69/103; H04L 12/4641; H04L 45/74; H04L 63/0485; H04L 69/163; H04L 69/22; H04L 2101/622; H04L 9/3263; H04L 67/1097; H04L 69/16; G06F 30/34
See application file for complete search history.

(56) References Cited

U.S. PATENT DOCUMENTS 4,972,361 A 11/1990 Rader
6,226,680 B1 5/2001 Boucher et al.
(Continued)

FOREIGN PATENT DOCUMENTS

KR 10-2005-0073506 7/2005
WO 2006/093079 9/2006
(Continued)

OTHER PUBLICATIONS

The International Bureau of WIPO; PCT International Preliminary Report of Patentability, issued in connection to PCT/US2019/056644; 7 pages; Apr. 27, 2021; Switzerland.
(Continued)

*Primary Examiner* — Farzana B Huq
(74) *Attorney, Agent, or Firm* — Greenberg Traurig LLP

(57) ABSTRACT

Systems and methods for in-line TCP processing using a systolic array. For example, data received for storage is processed in-line prior to encryption and/or sending to a remote storage device (e.g., cloud storage or server).

19 Claims, 2 Drawing Sheets

(51) Int. Cl.
  *H04L 9/40* (2022.01)
  *H04L 12/46* (2006.01)
  *H04L 45/74* (2022.01)
  *H04L 69/163* (2022.01)
  *H04L 69/22* (2022.01)
  *H04L 101/622* (2022.01)

(56) References Cited

U.S. PATENT DOCUMENTS

| | | |
|---|---|---|
| 6,247,060 B1 | 6/2001 | Boucher et al. |
| 6,480,937 B1 | 11/2002 | Vorbach et al. |
| 6,571,381 B1 | 5/2003 | Vorbach et al. |
| 6,687,788 B2 | 2/2004 | Vorbach et al. |
| 6,990,555 B2 | 1/2006 | Vorbach et al. |
| 7,003,660 B2 | 2/2006 | Vorbach et al. |
| 7,069,372 B1 | 6/2006 | Leung, Jr. et al. |
| 7,174,443 B1 | 2/2007 | Vorbach et al. |
| 7,210,129 B2 | 4/2007 | May et al. |
| 7,266,725 B2 | 9/2007 | Vorbach et al. |
| 7,382,787 B1 | 6/2008 | Barnes et al. |
| 7,394,284 B2 | 7/2008 | Vorbach |
| 7,418,536 B2 | 8/2008 | Leung et al. |
| 7,434,191 B2 | 10/2008 | Vorbach et al. |
| 7,444,531 B2 | 10/2008 | Vorbach et al. |
| 7,450,438 B1 | 11/2008 | Holst et al. |
| 7,480,825 B2 | 1/2009 | Vorbach |
| 7,525,904 B1 | 4/2009 | Li et al. |
| 7,577,822 B2 | 8/2009 | Vorbach |
| 7,581,076 B2 | 8/2009 | Vorbach |
| 7,595,659 B2 | 9/2009 | Vorbach et al. |
| 7,602,214 B2 | 10/2009 | Vorbach |
| 7,657,861 B2 | 2/2010 | Vorbach et al. |
| 7,657,877 B2 | 2/2010 | Vorbach et al. |
| 7,710,991 B1 | 5/2010 | Li et al. |
| 7,782,087 B2 | 8/2010 | Vorbach |
| 7,840,842 B2 | 11/2010 | Vorbach et al. |
| 7,844,796 B2 | 11/2010 | Vorbach et al. |
| 7,928,763 B2 | 4/2011 | Vorbach |
| 7,996,827 B2 | 8/2011 | Vorbach et al. |
| 8,058,899 B2 | 11/2011 | Vorbach et al. |
| 8,069,373 B2 | 11/2011 | Vorbach |
| 8,099,618 B2 | 1/2012 | Vorbach et al. |
| 8,127,061 B2 | 2/2012 | Vorbach et al. |
| 8,145,881 B2 | 3/2012 | Vorbach et al. |
| 8,156,284 B2 | 4/2012 | Vorbach et al. |
| 8,209,653 B2 | 6/2012 | Vorbach et al. |
| 8,270,399 B2 | 9/2012 | Holst et al. |
| 8,270,401 B1 | 9/2012 | Barnes et al. |
| 8,281,265 B2 | 10/2012 | Vorbach et al. |
| 8,301,872 B2 | 10/2012 | Vorbach et al. |
| 8,312,301 B2 | 11/2012 | Vorbach et al. |
| 8,335,915 B2 | 12/2012 | Plotkin et al. |
| 8,423,780 B2 | 4/2013 | Plotkin et al. |
| 8,429,385 B2 | 4/2013 | Vorbach |
| 8,686,549 B2 | 4/2014 | Vorbach |
| 8,791,190 B2 | 7/2014 | Paressley et al. |
| 8,812,820 B2 | 8/2014 | Vorbach et al. |
| 8,914,590 B2 | 12/2014 | Vorbach et al. |
| 9,037,807 B2 | 5/2015 | Vorbach |
| 9,094,237 B2 | 7/2015 | Barnes et al. |
| 9,170,812 B2 | 10/2015 | Vorbach et al. |
| 9,231,865 B2 | 1/2016 | Sankaralingam et al. |
| 9,317,718 B1 | 4/2016 | Takahashi |
| 9,374,344 B1 | 6/2016 | Takahashi |
| 9,794,064 B2 | 10/2017 | Takahashi |
| 2001/0021949 A1 | 9/2001 | Blightman et al. |
| 2001/0023460 A1 | 9/2001 | Boucher et al. |
| 2001/0027496 A1 | 10/2001 | Boucher et al. |
| 2001/0036196 A1 | 11/2001 | Blightman et al. |
| 2003/0046607 A1 | 3/2003 | May et al. |
| 2003/0056202 A1 | 3/2003 | May et al. |
| 2003/0074518 A1 | 4/2003 | Vorbach et al. |
| 2003/0131233 A1* | 7/2003 | Garstin .................... H04L 9/12 |
| | | 713/160 |
| 2004/0015899 A1 | 1/2004 | May et al. |
| 2004/0025005 A1 | 2/2004 | Vorbach et al. |
| 2004/0095998 A1* | 5/2004 | Luo ........................ H04N 5/145 |
| | | 348/E5.066 |
| 2004/0128474 A1 | 7/2004 | Vorbach |
| 2004/0153608 A1 | 8/2004 | Vorbach et al. |
| 2004/0153642 A1 | 8/2004 | Plotkin et al. |
| 2004/0158640 A1 | 8/2004 | Philbrick et al. |
| 2004/0190512 A1 | 9/2004 | Schultz |
| 2004/0243984 A1 | 12/2004 | Vorbach et al. |
| 2004/0249880 A1 | 12/2004 | Vorbach |
| 2005/0022062 A1 | 1/2005 | Vorbach |
| 2005/0053056 A1 | 3/2005 | Vorbach et al. |
| 2005/0066213 A1 | 3/2005 | Vorbach et al. |
| 2005/0086462 A1 | 4/2005 | Vorbach |
| 2005/0086649 A1 | 4/2005 | Vorbach et al. |
| 2005/0223212 A1 | 10/2005 | Vorbach et al. |
| 2005/0257009 A9 | 11/2005 | Vorbach et al. |
| 2006/0013162 A1 | 1/2006 | Lim |
| 2006/0075211 A1 | 4/2006 | Vorbach |
| 2006/0117126 A1 | 6/2006 | Leung et al. |
| 2006/0136735 A1 | 6/2006 | Plotkin et al. |
| 2006/0165006 A1* | 7/2006 | Kelz ........................ H04W 28/18 |
| | | 370/252 |
| 2006/0192586 A1 | 8/2006 | Vorbach |
| 2006/0245225 A1 | 11/2006 | Vorbach |
| 2006/0248317 A1 | 11/2006 | Vorbach et al. |
| 2007/0011433 A1 | 1/2007 | Vorbach |
| 2007/0050603 A1 | 3/2007 | Vorbach et al. |
| 2007/0083730 A1 | 4/2007 | Vorbach et al. |
| 2007/0091359 A1* | 4/2007 | Suzuki .................... H04N 21/4623 |
| | | 358/1.14 |
| 2007/0113046 A1 | 5/2007 | Vorbach et al. |
| 2007/0150637 A1 | 6/2007 | Vorbach |
| 2007/0195951 A1* | 8/2007 | Leung, Jr. .............. H04L 9/0618 |
| | | 380/37 |
| 2007/0299993 A1 | 12/2007 | Vorbach et al. |
| 2008/0191737 A1 | 8/2008 | Vorbach |
| 2009/0006895 A1 | 1/2009 | May et al. |
| 2009/0031104 A1 | 1/2009 | Vorbach et al. |
| 2009/0037587 A1 | 2/2009 | Yoshimi et al. |
| 2009/0037865 A1 | 2/2009 | Vorbach et al. |
| 2009/0063702 A1 | 3/2009 | Holst et al. |
| 2009/0100286 A1 | 4/2009 | Vorbach et al. |
| 2009/0144522 A1 | 6/2009 | Vorbach et al. |
| 2009/0146691 A1 | 6/2009 | Vorbach et al. |
| 2009/0150725 A1 | 6/2009 | Vorbach |
| 2009/0172351 A1 | 7/2009 | Vorbach et al. |
| 2009/0210653 A1 | 8/2009 | Vorbach et al. |
| 2009/0300262 A1 | 12/2009 | Vorbach |
| 2010/0023796 A1 | 1/2010 | Vorbach et al. |
| 2010/0039139 A1 | 2/2010 | Vorbach |
| 2010/0070671 A1 | 3/2010 | Vorbach et al. |
| 2010/0095088 A1 | 4/2010 | Vorbach |
| 2010/0095094 A1 | 4/2010 | Vorbach et al. |
| 2010/0122064 A1 | 5/2010 | Vorbach |
| 2010/0153654 A1 | 6/2010 | Vorbach et al. |
| 2010/0174868 A1 | 7/2010 | Vorbach |
| 2010/0238942 A1* | 9/2010 | Estan ...................... H04L 45/60 |
| | | 370/401 |
| 2010/0241823 A1 | 9/2010 | Vorbach et al. |
| 2011/0006805 A1 | 1/2011 | Vorbach |
| 2011/0060942 A1 | 3/2011 | Vorbach |
| 2011/0161977 A1 | 6/2011 | Vorbach |
| 2011/0238948 A1 | 9/2011 | Vorbach et al. |
| 2012/0197856 A1 | 8/2012 | Banka et al. |
| 2012/0277333 A1 | 11/2012 | Pressley et al. |
| 2012/0320921 A1* | 12/2012 | Barnes .................... H04L 69/12 |
| | | 370/392 |
| 2013/0283060 A1 | 10/2013 | Kulkarni et al. |
| 2015/0095645 A1 | 4/2015 | Eldar |
| 2015/0106596 A1 | 4/2015 | Vorbach et al. |
| 2016/0055120 A1 | 2/2016 | Vorbach et al. |
| 2017/0085372 A1 | 3/2017 | Anderson et al. |
| 2017/0230447 A1 | 8/2017 | Harsha et al. |
| 2017/0359317 A1* | 12/2017 | Anderson ............ H04L 63/0478 |
| 2019/0158427 A1 | 5/2019 | Harsha et al. |
| 2020/0004695 A1 | 1/2020 | Anderson et al. |

(56) References Cited

U.S. PATENT DOCUMENTS

2020/0192701 A1\* 6/2020 Horowitz .............. G06F 9/3851
2020/0293487 A1   9/2020 Anderson

FOREIGN PATENT DOCUMENTS

WO   2020/023364   1/2020
WO   2020/092009   5/2020

OTHER PUBLICATIONS

The International Bureau of WIPO; PCT International Preliminary Report on Patentability, issued in connection to PCT/US2019/042793; Jan. 26, 2021; 7 pages; Switzerland.

Korean Intellectual Property Office; PCT International Search Report, issued in connection to PCT/US2019/042793; Nov. 11, 2019; 3 pages; Korea.

Korean Intellectual Property Office; PCT Written Opinion of the International Searching Authority, issued in connection to PCT/US2019/042793; Nov. 11, 2019; 6 pages; Korea.

Korean Intellectual Property Office; PCT International Search Report, issued in connection to PCT/US2019/056644; Feb. 5, 2020; 9 pages; Korea.

Korean Intellectual Property Office; PCT Written Opinion of the International Searching Authority, issued in connection to PCT/US2019/056644; Feb. 5, 2020; 6 pages; Korea.

Shaaban; Systolic Architectures; EECC756, Portland State University; Mar. 11, 2003.

\* cited by examiner

IN-LINE TRANSMISSION CONTROL PROTOCOL PROCESSING ENGINE USING A SYSTOLIC ARRAY

RELATED APPLICATIONS

This application claims priority to U.S. Provisional Application Ser. No. 62/703,743, filed Jul. 26, 2018, entitled "IN-LINE TRANSMISSION CONTROL PROTOCOL PROCESSING ENGINE USING A SYSTOLIC ARRAY," by TIMOTHY PAUL ABEL et al., the entire contents of which application is incorporated by reference as if fully set forth herein.

FIELD OF THE TECHNOLOGY

At least some embodiments disclosed herein relate to in-line TCP processing (e.g., for secure data storage) in general.

BACKGROUND

An encryption appliance typically inserts in-line into an existing network and encrypts full duplex data at, for example, multigigabit line speeds. This can reduce performance penalties imposed by, for example, encryption software running on a general-purpose server, and can allow encryption of data in flight to storage at local or remote locations.

Data can be stored remotely using various protocols. One example of a storage protocol is an Internet Small Computer Systems Interface (iSCSI), which is an Internet Protocol (IP)-based storage networking standard for linking data storage facilities. For example, iSCSI can be used to transmit data over local area networks (LANs), wide area networks (WANs), or the Internet and can enable location-independent data storage and retrieval. The iSCSI protocol can allow client devices to send, for example, SCSI commands to storage devices on remote servers. In one example, iSCSI is used as a storage area network protocol, allowing consolidation of storage into storage arrays for clients (e.g., database and web servers).

In some cases, data to be stored remotely requires Transmission Control Protocol (TCP) processing prior to being stored. The Transmission Control Protocol provides, for example, a communication service between an application and the Internet Protocol (e.g., host-to-host connectivity at the transport layer of the Internet model). An application does not need to know the particular mechanisms for sending data via a link to another host. At the transport layer, TCP handles handshaking and transmission details and presents an abstraction of the network connection to the application (e.g., through a network socket interface).

At lower levels of the protocol stack, due to network congestion, traffic load balancing, or other unpredictable network behavior, IP packets may be lost, duplicated, or delivered out of order. TCP detects these problems, requests re-transmission of lost data, and rearranges out-of-order data. If the data still remains undelivered, the source is notified of this failure. Once a TCP receiver has reassembled a sequence of data originally transmitted, it passes the data to the receiving application.

TCP is, for example, used by many applications available by internet, including the World Wide Web (WWW), e-mail, File Transfer Protocol, Secure Shell, peer-to-peer file sharing, and streaming media applications. TCP is, for example, designed for accurate delivery rather than timely delivery and can incur relatively long delays while waiting for out-of-order messages or re-transmissions of lost messages. TCP is, for example, a stream delivery service which guarantees that all bytes received will be identical to bytes sent and will be in the correct order.

In some cases, hardware implementations known as TCP offload engines (TOEs) are used to handle TCP processing. One problem of TOEs is that they are difficult to integrate into computing systems, sometimes requiring extensive changes in the operating system of the computer or device.

SUMMARY OF THE DESCRIPTION

Systems and methods for TCP processing of data (e.g., packets in an incoming data stream) are described herein. Some embodiments are summarized in this section.

In some cases, data coming from a network to a device (such as data to be stored in a remote storage device) may require processing such as TCP packet processing or encryption. Traditional TCP packet processing solutions using general purpose processors, even with TCP offload engines, are too slow to keep up with high speed networks data rates such as 100 Gigabit per second networks. Various embodiments herein speed up TCP packet processing to network line speed rates by using TCP in-line processing engines (TIE) configured as part of a systolic array of processing elements.

In various embodiments, a systolic array uses multiple in-line single-function processing elements to process incoming and outgoing data in a pipelined manner. Data passing through each processing element can be spread out to dedicated hardware resources with each processing element having all the resources needed to process and move data to the next pipeline step on each clock tick. The TIEs process incoming TCP packets by identifying the connection with which the packet is associated, stripping out the TCP headers, assembling data into the correct blocks required by the underlying data type (e.g. Network File System (NFS) or Amazon Web Services (AWS)) and requesting re-transmission of missing packets. The in-line TCP processing engines also prepare outbound data for transmission by assembling the outbound data, adding TCP headers and handling re-transmission requests if needed. When data is finished processing through a TIE, it is sent on to the next systolic processing element such as a network protocol engine or an encryption engine. Processing TCP packets using systolic TCP in-line processing engines enables fast TCP packet processing.

In one embodiment, a method includes: receiving, over a first network, a first stream of TCP packets; converting, by at least one processor or FPGA, the first stream of TCP packets into a stream of bytes; processing the stream of bytes; after processing the stream of bytes, converting the stream of bytes to a second stream of TCP packets; and sending, over a second network, the second stream of TCP packets.

In one embodiment, a method includes: receiving incoming data; identifying a connection associated with the data; and assembling the data to correspond to a data type.

In one embodiment, a system includes: at least one processor or FPGA; and memory storing instructions configured to instruct or program the at least one processor or FPGA to: receive data from a local device; remove headers from the data to provide inbound data; assemble the inbound data into blocks corresponding to a data type; encrypt the assembled inbound data to provide encrypted data; and send the encrypted data to a remote storage device.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

Figure 1:
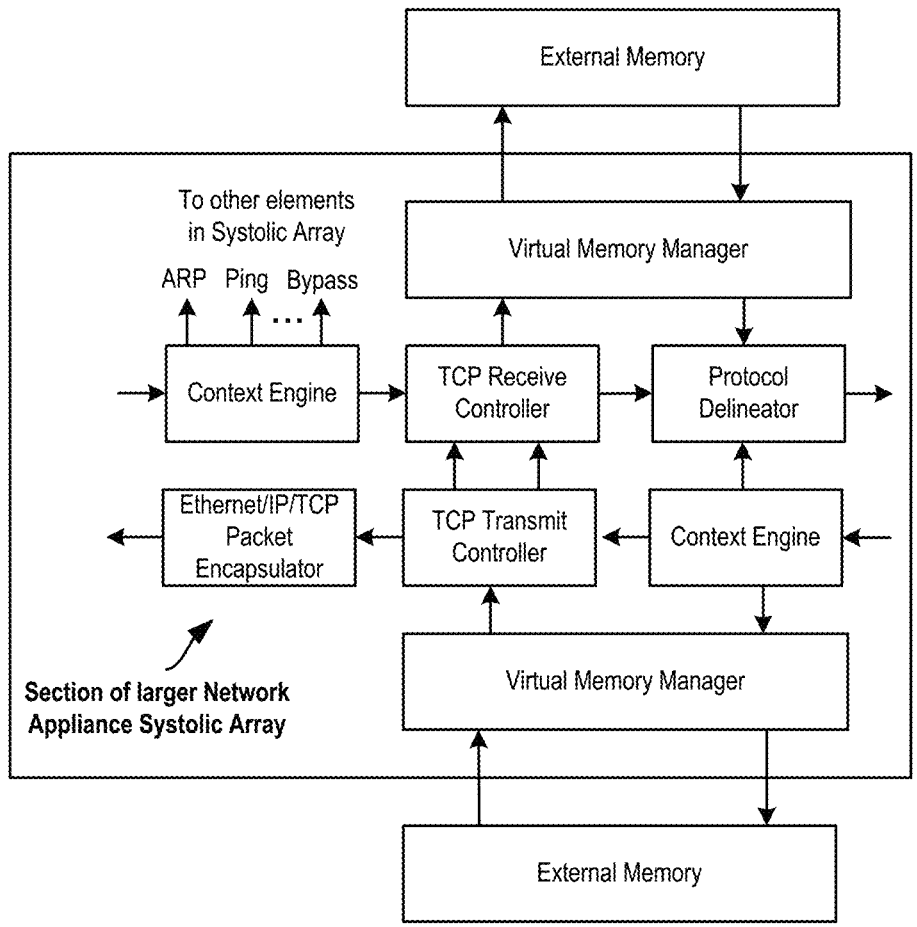
FIG. 1 shows an encryption device that performs TCP processing using a systolic array, according to one embodiment.

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Many hardware-only based network appliances need a "Transmission Control Protocol" block to either originate, terminate, or modify a TCP stream. The present embodiments include the realization that traditional TCP packet processing solutions using general purpose processors or TCP offload engines are too slow to keep up with high speed networks data rates such as 100 Gigabit per second networks.

Prior approaches include, for example, use of a TCP offload engine (TOE). TOEs are used, for example, in network cards. A TOE offloads TCP processing to dedicated hardware so the computer's central processing unit (CPU) is not burdened with TCP processing. After processing the TCP stream, a TOE returns the data stream to the CPU for further processing.

The present embodiments further include the realization that previous TCP processing solutions have not been pipelined with other systolic elements. Instead, prior TCP processing was done in an "offload" fashion such that software is present in the data path. Software is a less desirable, serial process due to limited resource availability. A traditional software approach has a single processing element doing each function in a roughly sequential fashion, and exhibits the technical problem of limiting bandwidth scaling to what that processor can handle.

In contrast to the above, the TCP in-line engine according to various embodiments described herein processes the TCP stream and sends the data stream directly to the next processing element. It does not return the data stream to the source. Sending the data stream directly provides a technical solution to the technical problems caused by prior offloading approaches as described above.

The systolic TCP in-line processing solution as described for various embodiments herein is directly in the client to storage path and is not offloaded to asynchronous general-purpose processing elements. Thus, it processes the TCP stream at the network line speed.

In one embodiment, the systolic TCP in-line engine runs TCP stream processing through multiple systolic array elements (e.g., in one or more systolic arrays implemented in an FPGA). The TCP engine is in-line and interconnected with many other systolic array processing elements performing functions such as cryptography. The systolic array approach is designed for high speed processing and gets the data processing throughput up to network line speed.

In one exemplary implementation that uses in-line TCP processing, a user system writes out data blocks to a remote storage device, and an encryption appliance stores data associated with the writing of the data blocks (e.g., an identifier can be stored for each data block). When the data blocks are later retrieved from the remote storage device, the encryption appliance can access the stored data (e.g., access the stored data block identifiers). The encryption appliance can use TCP processing as described in the various embodiments below.

FIG. 1 shows an encryption device that performs TCP processing in a TCP processing engine that uses a systolic array, according to one embodiment. The encryption device (e.g., an encryption appliance or an encryption gateway) includes two virtual memory managers. The virtual memory managers are coupled to external memory (e.g., DRAM and/or non-volatile memory).

The systolic array can be implemented, for example, using one or more FPGAs. The encryption device can include one or more processors that are used to compile or program the FPGAs to correspond to the TCP processing. The FPGAs can be custom programmed to do TCP processing for a specific network or file storage protocol.

In one example, the receive context engine (top left of FIG. 1) receives data (e.g., packets) over a network from a local device (e.g., the data is to be written to remote storage at the request of the local device). The protocol delineator transmits data (e.g., data blocks corresponding to a file storage protocol or data type) to a storage device (e.g., a remote storage device such as cloud storage or a remoter server).

In one example, the transmit context engine (bottom right of FIG. 1) receives data from the storage device (e.g., the data is to be read from remote storage at the request of the local device that previously stored the data, or as requested by another computing device, for example, authorized by the local device).

In one embodiment, TCP packet processing speed is increased up to network line speed rates by using TCP in-line processing engines (TIE) configured as part of a systolic array of processing elements, as described herein. A systolic array is a multi-dimensional array of interconnected processing blocks that allows for highly parallel data processing. It uses multiple in-line single-function processing elements to pipeline and process incoming and outgoing data very quickly. The TIE blocks can interoperate with other systolic elements in the array and are scalable for different bandwidth needs.

A systolic processing array can have a wide variety of processing elements such as TCP protocol processing, network protocol, protocol delineation, data encryption, etc. Each processing element is, for example, a small, single function processor. As data comes in, it gets processed by the first processing element, and is forwarded to the next processing element, then on to the next processing element, etc. until all processing is complete. Each processing element is part of a data processing pipeline. Within each processing element, data is also pipelined so that each processing element can take in new data on each clock tick. In one embodiment, each processing element performs just one function and has the specific resources needed to be able to process data on each clock tick.

For example, a minimum-sized Ethernet frame is sixty-four bytes. If the data path is set to sixty-four bytes wide, the hardware in the processor can be spread out across a sixty-four-byte parallel pipeline so it can take in a complete packet on each clock tick. For a 200 MHz clock this would be 100 Gigabit per second operation. If processing a data packet takes three clock ticks, the processing element would have three pipeline stages to allow it to take in a new data packet on each clock tick. This provides a solution for fast processing with, for example, thousands of concurrent connections. For example, each processor handles only one step. These TCP processing resources are applied using a systolic array.

In one embodiment, the TCP in-line engine is one processing element in a pipeline of systolic processing elements. It is a TCP endpoint that is the packet input engine and is a layer of processing before the crypto engine. For example, data packets may come in, get processed by the TCP packet processor, move on to a network protocol processor, then on to an encryption processor, etc., before being sent to storage.

The TCP protocol corresponds to the Transport Layer defined in the Open System Interconnect (OSI) software model. The OSI software model is a standard method of defining software interaction and dependencies and was created by the International Organization for Standardization. Other software layers defined by the OSI standard include the Network Layer used for Internet Protocol processing, the Data Link Layer used for Ethernet processing, etc.

The TCP processing engine converts input packets coming in to a byte stream for further processing by another engine or other layer. Each TIE can support, for example, thousands of concurrent connections. The TIEs process incoming TCP packets by identifying the connection with which the packet is associated, stripping out the TCP headers, assembling data into the correct blocks required by the underlying data type (e.g. Network File System or Amazon Web Services) and requesting re-transmission of missing packets. The in-line TCP processing engines also prepare outbound data for transmission by assembling the outbound data, adding TCP headers, and handling re-transmission requests if needed.

In one embodiment, each TIE is composed of several processing elements. Each element is an independent processor. These include the receive context engine, TCP receive controller, virtual memory manager, protocol delineator, transmit context engine, transmit TCP controller and Ethernet/IP/TCP packet encapsulator. When a packet first comes into the TIE, the receive context engine searches the header to determine if the packet should be handled by the TIE, determines whether it uses a network protocol supported by the TIE, and identifies where the packet should be routed next.

For example, packets may be routed to an Address Resolution Protocol (ARP) stage to resolve the Media Access Control (MAC) addresses, a network ping stage to respond to or pass on network ping requests, further TCP context processing to determine to which connection a packet belongs and retrieve the state for that TCP packet, the TCP receive controller, or just a bypass stage if no further processing is required. TCP context data is stored, for example, within internal FPGA memory to allow for fast switching between contexts.

In one embodiment, the TCP receive controller looks at packet headers to determine if the packet has the correct sequence number. TCP uses sequence numbers to get the packets in the right order and determine if a packet has been dropped. If a packet has been dropped, the TCP receive controller will request re-transmission of any lost packets. The TCP receive controller then strips off the TCP header and saves the packet data from the original TCP data stream, minus the header, to memory.

In one embodiment, a virtual memory manager interfaces with external memory to store the TCP data packets by mapping the TCP sequence to a physical memory location. External memory is used as a place to store the TCP stream until all the pieces needed for that specific network protocol have been received. For example, there could be one hundred different computers sending data, each with their own connections. Once enough data for a connection is received, the block of data is sent on to the next processing stage. The virtual memory manager can dynamically allocate memory to store packets. This results in much better memory utilization and ability to support more packets.

In one embodiment, the next step in the TCP receive pipeline is the protocol delineator. The protocol delineator separates data into blocks based on the protocol for which that device has been built (e.g. Network File System (NFS), Internet Small Computer Systems Interface (iSCSI), Amazon Web Services (AWS), Hypertext Transfer Protocol (HTTP), Transport Layer Security (TLS), etc.) Each protocol delineator is compiled for a specific protocol. For example, one TCP engine can support many protocol delineator engines. For each protocol, the data block size is either known or may be identified from data in the input stream. The protocol delineator is used to find the boundaries of each data block. In the TCP byte stream, the protocol delineator will find the beginning of the data block, separate out one block of data and send that block of data to the next section. For example, with an NFS block, the protocol delineator would need to find the first op-code, and then determine the next 500 bytes or whatever block size is correct for that particular NFS block.

In one embodiment, after protocol delineation, the receive packet is sent to the next systolic processing engine. There are several processors in the path before data is shipped off to storage, and the TIE is a pre-processor for these other processing engines. The next processing block could be the encryption engine. The encryption engine identifies what data needs to be encrypted and does the encryption.

In one embodiment, two TIE engines are used to implement a "bump-in-the-wire" systolic architecture. Each TIE is assigned to a physical ethernet connection on the box (e.g., the encryption hardware device). Each TIE can make as many Ethernet connections with servers as the context memory of the TIE will support. One TIE is connected to the unprocessed network side and the other TIE is connected to the processed network side. For example, processing could be data encryption. In this example, one TIE would connect to the unencrypted network side and the other TIE would connect to the encrypted network. As data enters the system, one engine does the TCP processing to convert from a stream of TCP packets to a stream of application bytes so further processing (e.g., encryption or decryption) can occur. Then, the second TIE converts from a stream of bytes to a stream of TCP packets.

In one embodiment, as the internal application processing (e.g., encryption) passes data to the TIE, the transmit context engine retrieves all the information for that connection. The transmit context engine is analogous in function to the receive context engine. The receive context engine looks at standard networking headers to determine the context for the packet. The transmit context engine looks at internal headers added by the encrypter to determine the packet context. The TCP transmit controller runs the TCP protocol in the reverse direction. It collects enough data in memory to generate the TCP packet, adds the TCP headers, handles retransmission if the packet gets lost, and sends the packet to the Ethernet/IP/TCP packet encapsulator.

In one embodiment, the Ethernet/IP/TCP packet encapsulator takes a packet of data and adds Ethernet headers such as source and destination MAC addresses, type fields, etc., so that the packet can be recognized by standard network devices. The packet is then sent out onto the network.

In one embodiment, the process for creating and implementing a systolic array starts with creating an algorithm, identifying what array elements are needed, and the data processing flow and interconnects needed between processing elements. Then, a tool is used to compile the required systolic array elements and interconnects, and program the systolic array solution into an FPGA. Each engine in the systolic array is built from FPGA gates using digital logic (AND gates, OR gates, flip-flops, etc.). Each engine has all the dedicated resources needed to perform its dedicated function.

In one embodiment, a TCP in-line engine can be implemented in software using multiple cores of a multi-core general purpose processor. However, implementation in software using general purpose processors typically would have a higher cost and lower bandwidth.

In one embodiment, a system does in-line encrypting/decrypting of file data between a client and remote storage at high data rates. To accomplish this, two TCP in-line engines are used. One TCP in-line engine extracts the TCP stream from the network packets so the encryption engine can process the file data. A second TCP in-line engine is then used to create a new TCP connection with the peer. This approach provides an advantage in that no slow CPU or CPU communication is needed, with its accompanying security risks.

Figure 2:
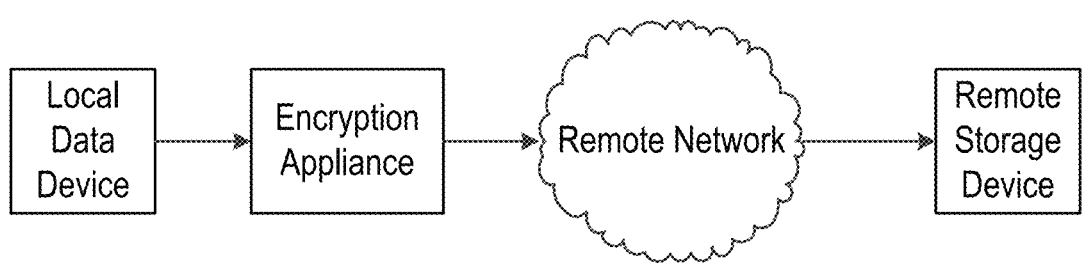
FIG. 2 shows a system for storing data blocks in a remote storage device, according to one embodiment.

FIG. 2 shows a system for storing data blocks in a remote storage device, according to one embodiment. The data blocks to be stored are sent by a local data device to an encryption appliance. The encryption appliance can be, for example, a network appliance that uses TCP processing as described for FIG. 1 (e.g., TCP processing using systolic stages as discussed above). The data blocks to be stored are sent over a remote network to the remote storage device. In one embodiment, the TCP processing is performed, followed by encryption processing when writing data blocks, or decryption processing when reading data blocks.

In one example, a data block is retrieved that was previously written to the remote storage device. For example, an encryption appliance can be used to write each data block to the remote storage device. The encryption appliance can be, for example, a hardware device that observes all data blocks being written out from a local data device's file system to a remote storage device, or read back into the local data device from a remote storage device. An example of this is an encryption device that is encrypting and decrypting data blocks to or from a remote storage provider such as Amazon Web Services (AWS) and transmitting the data through an Internet Small Computer Systems Interface (iSCSI).

In one embodiment, data blocks are stored using an iSCSI-based system or a system using another block storage protocol. The data blocks can also be stored on storage systems with self-encrypting drives. In one embodiment, TCP processing of incoming data includes assembly into data blocks corresponding to the storage protocol.

In one embodiment, TCP in-line processing as described herein can be integrated into systolic processing that is implemented using an encryption appliance as described in U.S. Patent Application No. 62/678,595, filed May 31, 2018, entitled "LOCALLY-STORED REMOTE BLOCK DATA INTEGRITY," by Jordan Anderson, the entire contents of which application is incorporated by reference as if fully set forth herein. For example, the next stages of processing to which data is routed during TCP processing can include encryption or decryption stages in a systolic array of an encryption appliance or gateway.

Variations

Without limiting the generality of the foregoing embodiments, various additional non-limiting embodiments and examples are now discussed below. In some embodiments, the network appliance or encryption appliance above can be implemented by or use encryption/decryption and/or communication methods and systems as described in U.S. patent application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, and/or as described in U.S. patent application Ser. No. 14/219,651, filed Mar. 19, 2014, entitled "SECURE END-TO-END COMMUNICATION SYSTEM," by Richard J. Takahashi, and/or as described in U.S. patent application Ser. No. 15/688,743, filed Aug. 28, 2017, entitled "CLOUD STORAGE USING ENCRYPTION GATEWAY WITH CERTIFICATE AUTHORITY IDENTIFICATION," by Jordan Anderson et al., the entire contents of which applications are incorporated by reference as if fully set forth herein. For example, the encryption appliance (e.g., the encryption appliance of FIG. 2) can use systolic matrix packet engines and multiplexers to process and route packets or other data, as described in the foregoing applications. In another example, the encryption appliance can be implemented using the encryption appliance as described in one or more of the foregoing applications. In another example, the encryption appliance or gateway is used to determine data integrity for data blocks stored in a remote storage device (e.g., a cloud storage server).

In one embodiment, data to be stored in remote storage is encrypted by the encryption appliance at a file or file object level, and at least one key is associated to a file object. Examples of an executable file include a complete program that can be run directly by an operating system (e.g., in conjunction with shared libraries and system calls). The file generally contains a table of contents, a number of code blocks and data blocks, ancillary data such as the memory addresses at which different blocks should be loaded, which shared libraries are needed, the entry point address, and sometimes a symbol table for debugging. An operating system can run an executable file by loading blocks of code and data into memory at the indicated addresses and jumping to it.

Examples of a file object include code that is logically divided into multiple source files. Each source file is compiled independently into a corresponding object file of partially-formed machine code known as object code. At a later time these object files are linked together to form an executable file. Object files have several features in common with executable files (table of contents, blocks of machine instructions and data, and debugging information). However, the code is not ready to run. For example, it has incomplete references to subroutines outside itself, and as such, many of the machine instructions have only placeholder addresses.

In one embodiment, the encryption appliance sets up a transport session with the remote cloud storage or server prior to receiving a payload from the client (e.g., from an application executing on the client), and the encryption appliance uses the transport session for sending or writing data from a plurality of client applications, including the client application, to the remote cloud storage or server.

In one embodiment, data received from a client for writing to remote storage includes a payload having a plurality of file objects, and a payload key is associated to each of the file objects. The payload key can be derived using metadata or file header information, as was described above. In either case, the metadata or file header contains information that is used to derive the payload cipher key with a KEK. The metadata or file header is maintained with the file/object for the life of the file/object so that it can be used at any time to derive the payload cipher key to decrypt the file/object (e.g., when it is read from remote cloud storage).

In one embodiment, the data received from the client comprises packets including a first packet, and a header is inserted into one or more of the packets (e.g., the first packet), wherein the header associates each packet to the client. The file object may be split among multiple packets. In the first packet of a file, identifying information is stored that is used to extract the correct key for decryption when the file is later read (this provides key association with the data).

In one embodiment, the payload key is associated to the client or an object in the data received from the client. The payload key association is made through an identifying feature of the cloud server protocol associated with the cloud or remote server. In Amazon Web Services (AWS), for example, a specific "bucket" (e.g., a folder) can have a key associated with it. The key to use is identified based on that information and uses that association.

In one embodiment, a method comprises: receiving incoming data; identifying a connection associated with the data; and assembling the data to correspond to a data type.

In one embodiment, identifying the connection and assembling the data are performed by processing elements of at least one systolic array.

In one embodiment, at least one FPGA includes the at least one systolic array.

In one embodiment, the incoming data comprises a packet, and the method further comprises: searching a header of the packet to determine if the packet uses a supported network protocol; and identifying a next stage for routing of the packet.

In one embodiment, the next stage is an address resolution protocol stage configured to resolve media access control (MAC) addresses.

In one embodiment, the next stage is a network ping stage configured to respond to network ping requests.

In one embodiment, the next stage is a context processing stage configured to determine the connection associated with the data.

In one embodiment, the method further comprises retrieving a state for the packet.

In one embodiment, the method further comprises removing a header from a packet of the incoming data to provide packet data, and storing the packet data in memory.

In one embodiment, the memory stores data from a TCP stream until a sufficient quantity of data as required by a network protocol has been received.

In one embodiment, the method further comprises: after the sufficient quantity of data as required by the network protocol has been received, sending the stored data to a next stage in a systolic array.

In one embodiment, the incoming data is an incoming TCP stream, the method further comprising dynamically allocating, by a virtual memory manager, memory to store packets from the incoming TCP stream.

In one embodiment, assembling the data to correspond to a data type comprises separating the incoming data into blocks based on a protocol associated with a remote storage device in which the blocks will be stored.

In one embodiment, the method further comprises determining, by a protocol delineator, boundaries of one or more data blocks within the data.

In one embodiment, the method further comprises determining, by the protocol delineator, sizes of data blocks within the data.

In one embodiment, the method further comprises identifying, by the protocol delineator, an op-code for each of the data blocks.

In one embodiment, the method further comprises determining a next systolic processing stage, and sending the data to the determined next systolic processing stage.

In one embodiment, the determined next systolic processing stage is an encryption engine or a cryptographic processing element.

In one embodiment, the encryption engine identifies data to be encrypted, and encrypts the identified data.

In one embodiment, the method further comprises, after assembling the data, processing the assembled data using an encryption engine.

In one embodiment, the incoming data is received from a local data device for storage in a remote storage device, the assembled data comprises data blocks, and each data block is associated with an identifier that is a block address provided by a file system of the local data device.

In one embodiment, the method further comprises: reading each data block from the remote storage device; and generating a hash of each read data block.

In one embodiment, the method further comprises determining, based on the generated hash, whether the respective read data block is valid.

In one embodiment, the method further comprises, in response to determining the respective read data block is valid, sending the respective read data block to the local data device.

In one embodiment, a method comprises: receiving, over a first network, a first stream of TCP packets; converting, by at least one processor or FPGA, the first stream of TCP packets into a stream of bytes; processing the stream of bytes; after processing the stream of bytes, converting the stream of bytes to a second stream of TCP packets; and sending, over a second network, the second stream of TCP packets.

In one embodiment, the second stream of TCP packets is sent to a remote storage device.

In one embodiment, processing the stream of bytes comprises encryption or decryption.

In one embodiment, processing the stream of bytes comprises processing file data.

In one embodiment, converting the first stream of TCP packets and processing the stream of bytes are performed by processing elements of at least one systolic array.

In one embodiment, at least one FPGA includes the at least one systolic array.

In one embodiment, processing the stream of bytes comprises looking at headers of packets to determine a context for each packet.

In one embodiment, the headers include at least one of a networking header or a header added by an encryption engine.

In one embodiment, the looking at headers is performed by a TCP context engine, the method further comprising adding headers to packets for transmission.

In one embodiment, a system comprises: at least one processor or FPGA; and memory storing instructions configured to instruct or program the at least one processor or FPGA to: receive data from a local device; remove headers from the data to provide inbound data; assemble the inbound data into blocks corresponding to a data type; encrypt the assembled inbound data to provide encrypted data; and send the encrypted data to a remote storage device.

In one embodiment, the data received from the local device is a data block, and the instructions are further configured to instruct or program the at least one processor or FPGA to read the data block from the remote storage device.

In one embodiment, the data received from the local device comprises a payload having a plurality of file objects.

In one embodiment, the instructions are further configured to instruct or program the at least one processor or FPGA to set up a transport protocol using at least one certificate received from a certificate authority, wherein the at least one certificate is verified prior to establishing a connection to the local device using the transport protocol.

In one embodiment, the instructions are further configured to instruct or program the at least one processor or FPGA to verify the identity of a cloud storage or server using the at least one certificate.

In one embodiment, the instructions are further configured to instruct or program the at least one processor or FPGA to set up a transport protocol using at least one certificate received from a certificate authority, and to verify the identity of the remote storage device, wherein the identity is verified prior to establishing a connection to the remote storage device using the transport protocol.

In one embodiment, the instructions are further configured to instruct or program the at least one processor or FPGA to: receive, from the remote storage device, using a transport protocol, the encrypted data; decrypt, using a payload key, the encrypted data to provide decrypted data; and send, to the local device, using a transport protocol, the decrypted data.

In one embodiment, the instructions are further configured to instruct or program the at least one processor or FPGA to verify the identity of the remote storage device, the verifying including receiving at least one certificate from a certificate authority.

In one embodiment, the data received from the local device comprises packets.

Closing

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the TCP processing system may be implemented using one or more FPGAs and/or other hardware in various types of computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement one or more of the following: an encryption appliance or gateway, a router, a switch, a key manager, a client application, cloud storage, a load balancer, and a firewall.

In one embodiment, a data processing system such as the computing device above is used to implement a user terminal, which may provide a user interface for control of a computing device. For example, a user interface may permit configuration of the encryption appliance or gateway. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). For example, the encryption appliance can be implemented using one or more FPGAs.

Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for in-line data transmission, the method comprising:
receiving, from a local device, a request to store data;
receiving, from the local device, incoming data on each of a plurality of clock ticks;
pipelining the incoming data to a transmission control protocol (TCP) processing engine, the TCP processing engine converting the incoming data into a byte stream;
pipelining the byte stream to an encryption engine, the encryption engine encrypting the byte stream;
pipelining the encrypted byte stream to a network protocol engine, the network protocol engine assembling the encrypted byte stream according to a storage protocol required by a remote storage device; and in response to the request to store data, sending the assembled encrypted byte stream to the remote storage device.

2. The method of claim 1, wherein the TCP processing engine includes at least one systolic array.

3. The method of claim 2, wherein at least one FPGA includes the at least one systolic array.

4. The method of claim 1, wherein the network protocol engine is configured to:
search a header of a packet in the byte stream to determine if the packet uses a supported network protocol; and
identify a next stage for routing of the packet.

5. The method of claim 4, wherein the next stage is an address resolution protocol stage configured to resolve media access control (MAC) addresses.

6. The method of claim 4, wherein the next stage is a network ping stage configured to respond to network ping requests.

7. The method of claim 4, wherein the next stage is a context processing stage configured to determine a connection associated with the data.

8. The method of claim 7, further comprising retrieving a state for the packet.

9. The method of claim 4, further comprising storing data from the packet in memory.

10. The method of claim 2, wherein the at least one systolic array is a multi-dimensional array of interconnected processing blocks that allows for parallel data processing.

11. An in-line data transmission control system, the system comprising:
a transmission control protocol (TCP) receiver configured to receive incoming data on each of a plurality of clock ticks, wherein the incoming data is associated with a request from a local device to store data;
a TCP processing engine configured to convert the incoming data into a byte stream, the incoming data being pipelined in from the TCP receiver;
an encryption engine configured to encrypt the byte stream; and
a network protocol engine configured to assemble the encrypted byte stream to correspond to a storage protocol of a remote storage device, wherein the encrypted byte stream is pipelined in from the encryption engine, and the assembled encrypted byte stream is sent to the remote storage device.

12. The system of claim 11, wherein the TCP processing engine includes at least one systolic array.

13. The system of claim 12, wherein the at least one systolic array includes at least one FPGA.

14. The system of claim 11, wherein the network protocol engine is configured to:
search a header of a packet in the byte stream to determine if the packet uses a supported network protocol; and
identify a next stage for routing of the packet.

15. The system of claim 14, wherein the next stage is an address resolution protocol stage configured to resolve media access control (MAC) addresses.

16. The system of claim 14, wherein the next stage is a network ping stage configured to respond to network ping requests.

17. The system of claim 14, wherein the next stage is a context processing stage configured to determine a connection associated with the data.

18. The system of claim 14, wherein the network protocol engine is further configured to store data from the packet in memory.

19. A method for in-line data transmission, the method comprising:
receiving, from a local device, a request to store data;
receiving, from the local device, incoming data corresponding to the request on each of a plurality of clock ticks;
pipelining the incoming data to a transmission control protocol (TCP) processing engine, the TCP processing engine using a first systolic array to convert the incoming data into a byte stream;
pipelining the byte stream to an encryption engine, the encryption engine encrypting the byte stream;
pipelining the encrypted byte stream to a network protocol engine, the network protocol engine using a second systolic array to assemble the encrypted byte stream corresponding to a storage protocol of a remote storage device; and
in response to the request to store data, transmitting the assembled encrypted byte stream to the remote storage device.

* * * * *